March 19, 1968 L. L. KLEINBERG 3,374,366

COMPLEMENTARY REGENERATIVE SWITCH

Filed Sept. 28, 1965

INVENTOR
LEONARD L. KLEINBERG

BY [signature] [signature] ATTORNEYS

United States Patent Office 3,374,366

Patented Mar. 19, 1968

3,374,366

COMPLEMENTARY REGENERATIVE SWITCH

Leonard L. Kleinberg, Greenbelt, Md., assignor to the United States of America as represented by the Administrator of the National Aeronautics and Space Administration Filed Sept. 28, 1965, Ser. No. 491,059
6 Claims. (Cl. 307—288)

ABSTRACT OF THE DISCLOSURE

A fast acting transistorized switch circuit incorporating a novel complementary PNP-NPN configuration employing both positive and negative feedback. Upon the application of a positive input pulse to the input terminal, the positive feedback overrides and regeneratively drives a transistor into saturation. Upon the removal of the positive input pulse, the negative feedback overrides and drives both transistors into the off condition in which state the circuit draws no power.

The invention described herein may be manufactured and used by or for the Government of the United States of America for governmental purposes without the payment of any royalties thereon or therefor.

The present invention relates to a transistor complementary regenerative switch, and more particularly relates to a complementary regenerative switch characterized by a PNP-NPN configuration having a positive feedback path and a negative feedback path. The positive feedback is present during the application of a signal input to the switch, and in which the positive feedback ratio is greater than the negative feedback thereby permitting regeneration.

The present invention seeks to provide a complementary regenerative switch consisting of PNP-NPN transistors, the circuit comprising the switch being DC coupled throughout, and in which the circuit of the switch consumes no power when not being used, and consumes power only while a signal input is applied thereto. The advantage of this type of operation is that it permits long life of the circuit components. It is seen that the circuit of the invention is unlike the Schmitt trigger, and the present invention provides a complementary shaping circuit that turns itself off when the input is removed.

In the circuit of the regenerative switch of the invention, both transistors of the complementary shaping circuit are in the OFF state. When an input signal is applied to the base of a first transistor, both the first and the second transistors are turned ON, and the second transistor is driven into saturation, while the first transistor operates along its linear characteristic.

An object therefore of the present invention is to provide a circuit comprising a complementary regenerative switch so that after removal of an input signal from the circuit, the circuit automatically turns itself off thereby dissipating no stand-by power.

Another object of the present invention is to provide a switching circuit in which the comparatively smaller output impedance, as compared to the output impedance of a conventional Schmitt trigger circuit, is present.

A further object and advantage of the invention is to provide a switch circuit that accepts any undefined voltage wave shape and produces from the output thereof a square wave output, and is capable of being produced on a single chip molecular circuit.

A further advantage and primary characteristic of the circuit is that when the input wave shape is no longer applied to the circuit input, the circuit shuts itself off and draws no power whatsoever. This characteristic, of course, is important as it is one means toward an extremely long lifetime for the circuit components.

Figure 1:
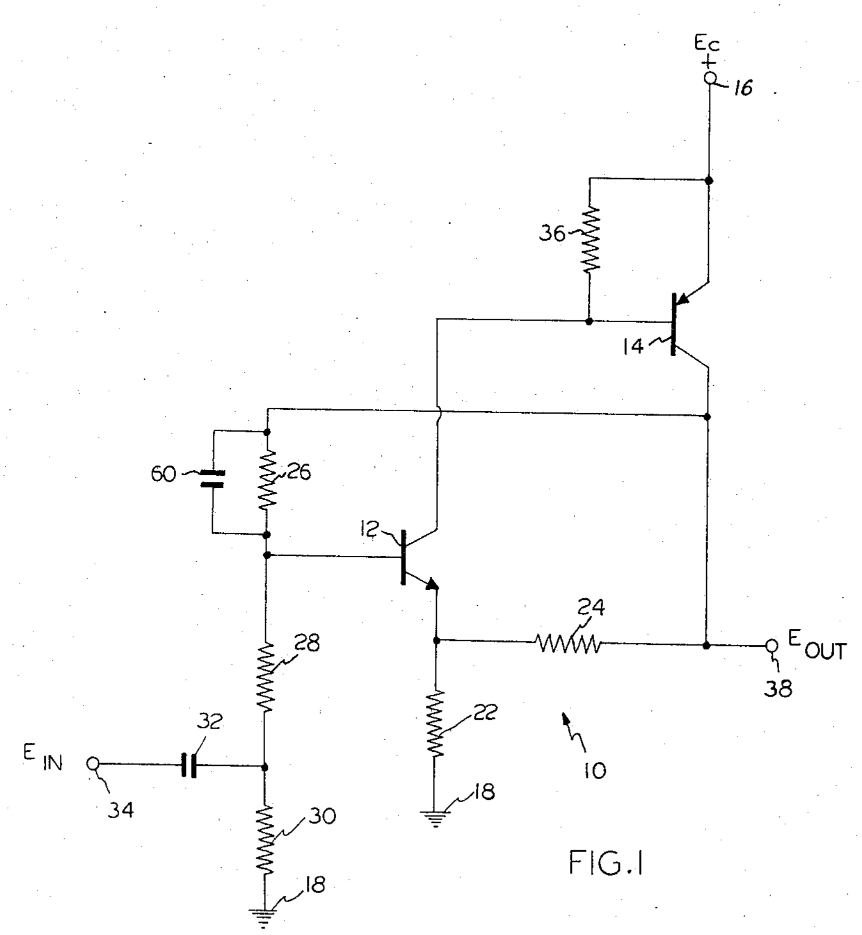
Figure 2:
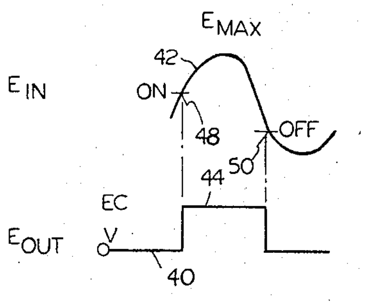

The above and other objects and advantages of the invention will become apparent upon full consideration of the following detailed description and accompanying drawings in which:

FIG. 1 is an electrical schematic circuit diagram of a complementary regenerative switch according to the preferred embodiment of the present invention; and FIG. 2 is a wave form diagram of the voltage inputs and outputs that are characteristic of the complementary regenerative switch of FIG. 1.

Referring now to the drawings, there is shown a complementary regenerative switch 10 having a pair of complementary transistors 12, 14, each transistor having an emitter, collector, and base. A positive terminal of a direct current potential source is connected to a terminal 16, and this is connected directly to the emitter of the PNP transistor 14, and the negative terminal of the direct current potential source (not shown) is connected to ground 18. The emitter of the NPN transistor 12 is connected directly to ground by means of resistance 22, and a further resistance 24 is seen connected between the emitter of transistor 12 and the collector of transistor 14. Also from the collector of transistor 14, there is an R-C network including a resistance 26 having its circuit completed to the base of the transistor 12, and from which an input resistance 28, resistance 30, are used to complete a circuit to ground 18. From an intermediate point of resistances 28, 30, an input signal is applied through a capacitance 32 from a terminal 34. The positive terminal 16 of the direct current potential source is also connected through a resistance 36 to the base of the transistor 14 and similarly to the collector of transistor 12. An output signal or voltage may be derived from the switch circuit 10 by a terminal 38 which is connected to the collector of transistor 14.

In the operation of the complementary regenerative switch, the wave forms of FIG. 2 are illustrative of the operation and are descriptive of the characteristics of the circuit. The transistors 12, 14 are in the OFF condition in the absence of a signal input being applied to terminal 34, and similarly there is no potential at the output terminal 38, as shown by the wave form diagrams, in which the output is at a value 40 in the absence of an input, as shown. The base of each of the transistors 12, 14 is at approximately the same potential as its respective emitter, and thus both transistors remain in the OFF condition.

If there is applied to the input terminal 34 a positive-going pulse or wave form 42, then the base of transistor 12 becomes positive with respect to its emitter, and then the transistor is triggered to a point in the linear region of its characteristic, producing a voltage drop across the capacitive-resistance network including resistance 26, and which also results in lowering the potential on the collector of transistor 12, which in turn lowers the potential on the base of the PNP transistor 14. This action produces triggering of transistor 14 to its ON condition, since transistor 14 is quickly driven into saturation by regeneration taking place as shall be described below. Saturation of transistor 14 results in collector current flow through resistances 22, 24 to raise the potential on the collector of the PNP transistor 14 to $E_c$ as shown by wave form 44, and is available at the output terminal 38. By means of the capacitance-resistance network, as exemplified in resistance 26, the condition of transistor 14 produces a positive bias on the base of the NPN transistor 12 which continues as long as the transistors 12, 14 are in their ON condition. In this state of conduction, the loading of transistor 12 upon resistance 28 forces the positive feedback ratio to be smaller than the negative feedback ratio of the circuit, and the circuit 10 cannot remain in the ON condition in the absence of a positive pulse applied to the input terminal 34.

As the input signal applied to terminal 34 goes negative with respect to point 48 on the input wave form 42, then the transistor 14 is pulled out of saturation when the input wave form reaches point 50 of FIG. 2, and regeneration takes place in the negative direction that quickly drives the transistors OFF, that is, transistor 14 is driven out of saturation, and transistor 12 is then in the OFF condition.

The PNP–NPN configuration of the switch has a positive feedback path and a negative feedback path, the positive feedback ratio being greater and thereby permitting regeneration. The approximate positive feedback ratio is $$\frac{R_{24}}{R_{26}+R_{28}}$$

and the negative feedback ratio is $$\frac{R_{22}}{R_{24}+R_{22}}$$

The output impedance is typically $R_{24}/10$.

Thus it is seen that while the input voltage is applied to the circuit, the circuit is regenerative, and that when the signal is removed from terminal 34, the product of the forward gain and the backward gain is less than unity.

The circuit turns ON when the input voltage is:

$$E_{on}=\frac{V_{co}}{G} \tag{1}$$

Where $V_{co}$ is that voltage that causes the transistor 12 to turn ON if it were isolated from the circuit, and G is equal to:

$$G=1-\frac{(R_{24}+R_{22})}{R_{22}+R_{24}+R_{26}+R_{28}} \tag{2}$$

The circuit turns OFF when the voltage is:

$$E_{off}=E_1\left(\alpha+\alpha\frac{Y_3}{Y_4'}-\frac{Y_3}{Y_4'}\right)-V_{be}\left(1+\frac{Y_3}{Y_4'}\right)$$

$$\alpha=\frac{R_{22}}{R_{22}+R_{24}};\ E_1=E_c-V_{cesat}$$

$$Y_3=\frac{1}{R_{26}};\ Y_4'=\frac{1}{R_{28}}+\frac{1}{BR_{12}};\ R_{12}=\frac{R_{22}R_{24}}{R_{22}+R_{24}}$$

$E_c$=voltage at terminal +.

The high frequency response of the circuit 10 is improved where capacitor 60 is applied to the circuit, but otherwise it may be conveniently omitted.

Additional embodiments of the invention in this specification will occur to others and therefore it is intended that the scope of the invention be limited only by the appended claims and not by the embodiment described hereinabove. Accordingly reference should be made to the following claims in determining the full scope of the invention.

What is claimed is:

1. A complementary regenerative switch for accepting an undefined voltage waveshape having a positive excursion and for delivering a square wave output, comprising an NPN transistor and a PNP transistor each having emitter, base, and collector; said emitter of said PNP transistor being connected to a tie point, said tie point adapted to receive a voltage source; circuit means connecting the collector of the NPN transistor to the base of the PNP transistor and for connecting the collector of the PNP transistor to the emitter of the NPN transistor, each circuit means including a resistance coupling to unlike reference points; a first resistance network coupled between an input terminal and the base of the NPN transistor; a second resistance network coupled between the collector of the PNP transistor and the base of the NPN transistor; means for applying an input signal to said input terminal whereby during positive excursion of said input signal, operation of the NPN transistor in its linear region is effected, which operation causes saturation of the PNP transistor, said saturation being effected by regeneration, and whereby upon the input signal being no longer positive, the PNP transistor becomes unsaturated and the transistors are each returned to a nonconductive condition by regeneration.

2. The invention of claim 1 wherein the non-conductive condition is achieved upon removal of said input signal.

3. The invention of claim 1 wherein a capacitance is connected across the second resistance network to improve the high frequency response of the switch.

4. The invention of claim 1 wherein a high conductance path is that circuit means between the collector of the NPN transistor and the base of the PNP transistor.

5. The invention of claim 4 wherein said circuit means connecting the collector of the PNP transistor to the emitter of the NPN transistor includes a resistance.

6. A complementary regenerative switch for accepting an undefined voltage waveshape having a positive excursion and delivering a square wave output, comprising an NPN transistor and a PNP transistor each having emitter, base, and collector; said emitter of said PNP transistor being connected to a tie point, said tie point being adapted to receive a voltage source; means connecting the collector of the NPN transistor without an impedance means to the base of the PNP transistor; means for connecting the collector of the PNP transistor to the base of the NPN transistor including an RC network, each of said connecting means including a resistance coupling from said connecting means to unlike reference points; a first resistance network coupled between an input terminal and the base of the NPN transistor; a second resistance network coupled between the collector of the PNP transistor and the emitter of the NPN transistor; said input terminal adapted for applying an input signal through the first resistance network whereby the NPN transistor, during the positive excursion of the input signal, is conductive in its linear region and the PNP transistor is rendered saturated and is held in saturation by the positive excursion of the input signal by regeneration, and upon an absence of the input signal the PNP transistor is no longer saturated and the transistors are then returned to a non-conductive condition by regeneration.

No references cited.

ARTHUR GAUSS, *Primary Examiner.*

J. ZAZWORSKY, *Assistant Examiner.*